United States Patent [19]

Inenaga et al.

[11] Patent Number: 5,557,040

[45] Date of Patent: Sep. 17, 1996

[54] METHOD AND APPARATUS FOR PRECIPITATION DETECTION AND DIFFERENTIATION

[75] Inventors: Andrew S. Inenaga, Sacramento; William D. Bachalo, Los Altos Hills; Subramanian V. Sankar, Fremont, all of Calif.

[73] Assignee: Aerometrics, Inc., Sunnyvale, Calif.

[21] Appl. No.: 607,522

[22] Filed: Feb. 27, 1996

Related U.S. Application Data

[63] Continuation of Ser. No. 295,996, Aug. 25, 1994, abandoned.

[51] Int. Cl.$^6$ ........................................... G01W 1/00
[52] U.S. Cl. ........................... 73/170.21; 73/170.17; 250/559.09
[58] Field of Search ................................. 73/170.21

[56] References Cited

U.S. PATENT DOCUMENTS

| | | |
|---|---|---|
| 3,440,396 | 4/1969 | Green, Jr. . |
| 3,575,641 | 4/1971 | Long et al. . |
| 4,010,383 | 3/1977 | Grassmann . |
| 4,051,466 | 9/1977 | Protze ................................. 340/234 |
| 4,068,133 | 1/1978 | Burwell . |
| 4,075,462 | 2/1978 | Rowe . |
| 4,242,673 | 12/1980 | Cooper . |
| 4,488,568 | 12/1984 | Hasenbeck . |
| 4,540,283 | 9/1985 | Bachalo . |
| 4,613,764 | 9/1986 | Lobato . |
| 4,656,333 | 4/1987 | Murphy . |
| 4,692,751 | 9/1987 | Upton et al. . |
| 4,701,613 | 10/1987 | Watanabe et al. . |
| 4,739,177 | 4/1988 | Borden ................................. 250/574 |
| 4,754,149 | 6/1988 | Wang . |
| 4,817,206 | 3/1989 | Calvani et al. ...................... 455/616 |
| 4,854,705 | 8/1989 | Bachalo ............................... 356/336 |
| 4,960,996 | 10/1990 | Hochstein . |
| 4,986,659 | 1/1991 | Bachalo ............................... 356/336 |
| 4,987,296 | 1/1991 | Kajioka et al. . |
| 5,015,931 | 5/1991 | Muller ................................. 318/483 |
| 5,029,101 | 7/1991 | Fernandes ........................... 364/483 |
| 5,105,129 | 4/1992 | Shimizu et al. . |
| 5,272,351 | 12/1993 | Andressen .......................... 250/561 |

FOREIGN PATENT DOCUMENTS 1285044  6/1991  Canada .

OTHER PUBLICATIONS

"Use of ORG-715 for Railroad Switch Heater Control," Scientific Technology, Inc., Application Note AN-07, two pages (Oct. 1993).

"Interfacing the ORG-715 to Personal Computers," Scientific Technology, Inc., Application Note AN-08, two pages (Nov. 1993).

"Scintillation Techniques in the Measurement of Precipitation," Scientific Technology, Inc., two pages (Dec. 1993).

Optical Precipitation Gauges, MINI-ORG (TM) and ORG (TM), Scientific Technology, Inc., four pages (published prior to Aug. 25, 1994).

*Primary Examiner*—Richard Chilcot
*Assistant Examiner*—Jewel V. Artis
*Attorney, Agent, or Firm*—Blakely, Sokoloff Taylor & Zafman

[57] ABSTRACT

A direct backscatter technique provides for the detection of precipitation in a measuring volume. A source light beam is projected into the measuring volume. Light in the volume, including source light scattered from any precipitation within the volume, is collected and detected. A signal is generated corresponding to the detected light. This signal is used to determine whether precipitation is present in the measuring volume. The light scattered from precipitation within the measuring volume may also be used to differentiate between types of particles. Rain and snow, for example, can be differentiated based on whether the transmitted light changed from its original polarization state.

16 Claims, 4 Drawing Sheets

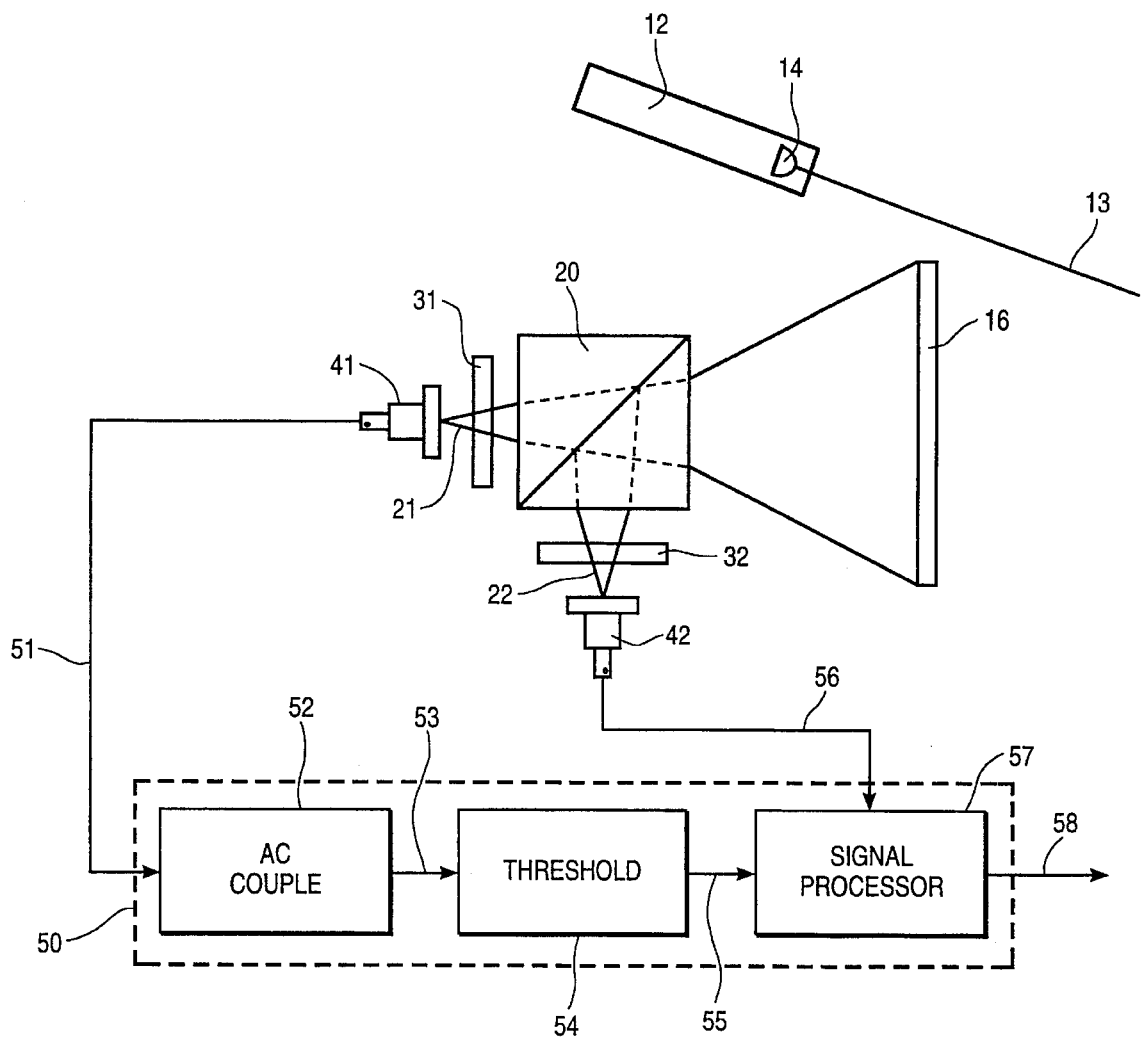
FIG_1

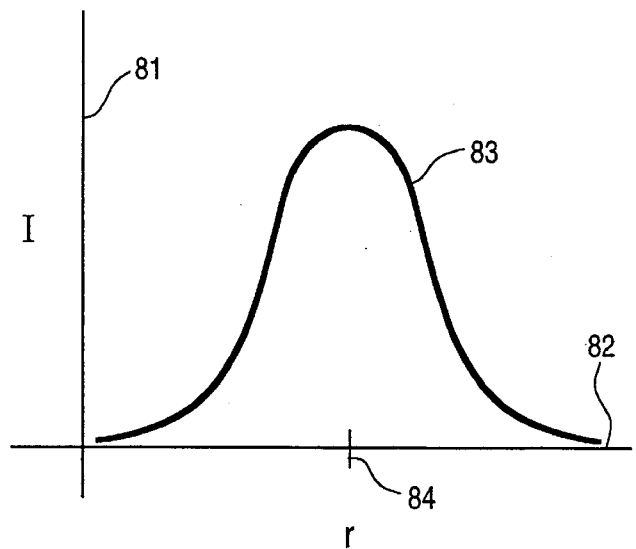
FIG_2
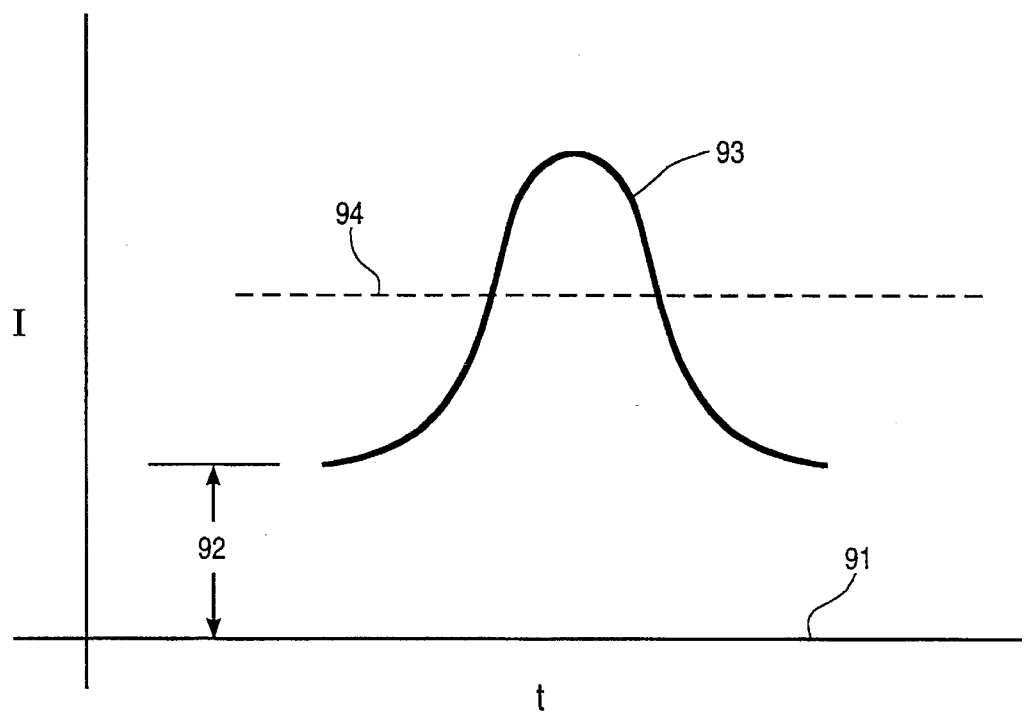
FIG_3

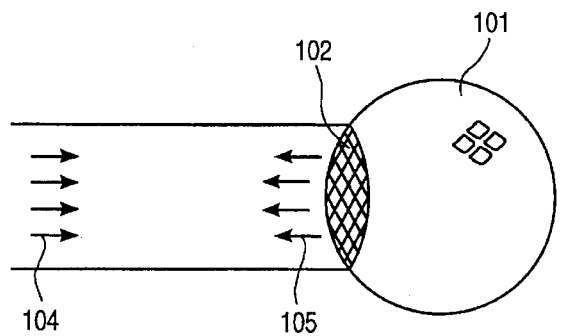
FIG_4
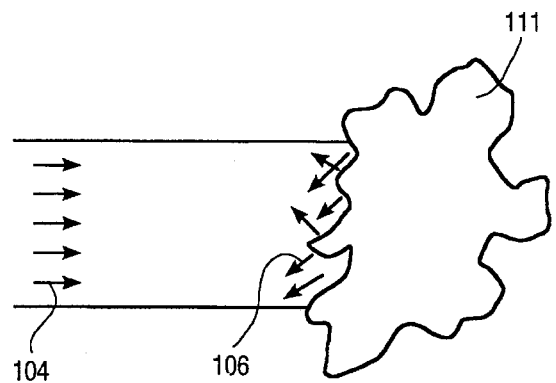
FIG_5
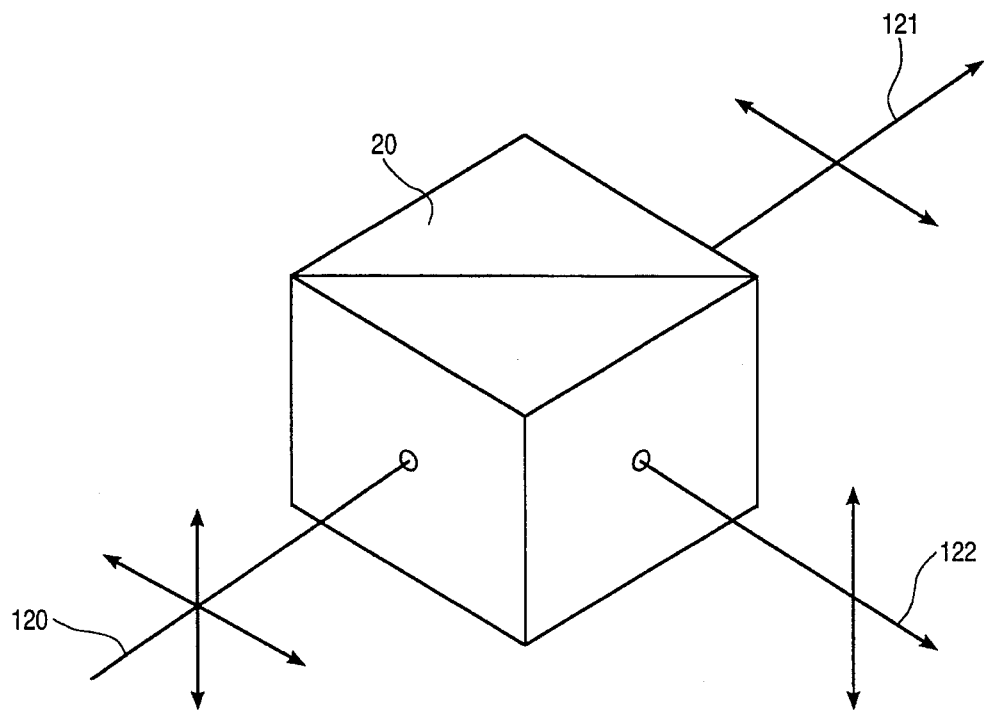
FIG_6

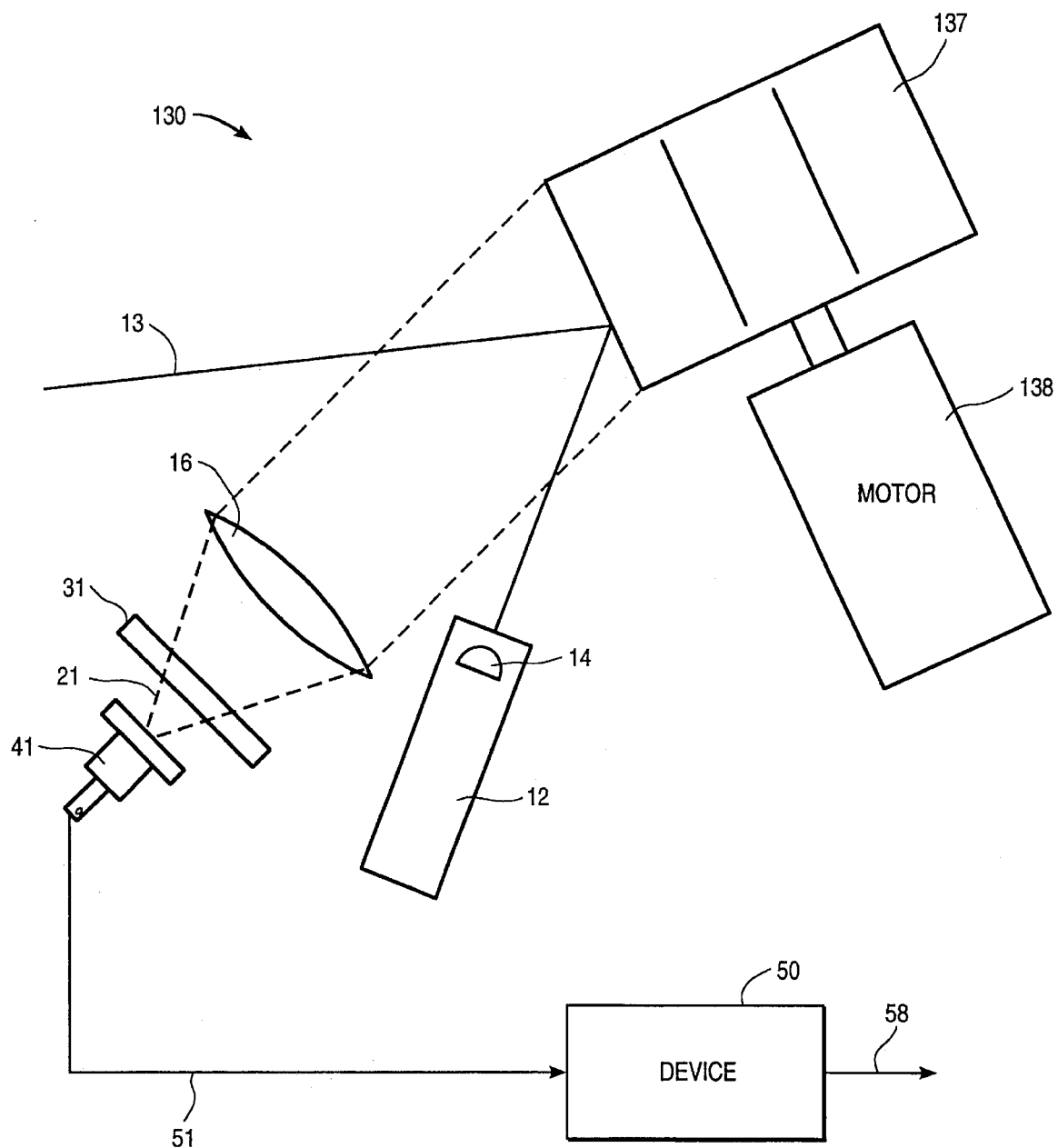
FIG_7

METHOD AND APPARATUS FOR PRECIPITATION DETECTION AND DIFFERENTIATION

This is a continuation of application Ser. No. 08/295,996, filed Aug. 25, 1994, abandoned.

BACKGROUND OF THE INVENTION

1. Field of the Invention

The present invention relates generally to the field of precipitation detection. The present invention also relates to the field of precipitation differentiation.

2. Description of the Related Art

With the advent of automated track switching systems in modern day railroad lines, constant monitoring of the condition of the rail system is necessary. In moderate weather conditions, track switching is a relatively easy task. However, heavy precipitation, such as snow or freezing rain, can foul the mechanical function of the switches.

Snow and ice buildup between rails presents a typical problem for rail switches, particularly as the ambient temperature decreases or as snow is compressed between ties and rails. Snow can also build up between the rails as a result of small "ground blizzards" left in the wake of passing trains. Such snow and ice buildup can obstruct and hence disable the mechanical movement required for proper rail switching. Freezing rain can also freeze up and disable rail switches.

Special snow and ice melting equipment is typically used to ensure reliable rail switching operations, providing safe operation of the railroad system. Heaters for example are operated at each switch location to melt snow and ice. These heaters, however, are often operated continuously during the months of cold weather even when present weather conditions pose no threat to reliable rail switching, wasting a tremendous amount of energy. This is particularly so for switches located in remote, barren locations and controlled with centralized command centers. The sensing of weather conditions near railway switching systems is therefore crucial to improving the efficiency and safe operation of the railways.

Various precipitation detection devices may be used to enable and disable snow and ice melting equipment such as a heater near railway switching systems. One such device is an electromechanical device that includes a heated wire-mesh screen positioned over a funneling system. Snow that falls incident upon the heated screen is melted. The water collected from the melting snow then acts as a contact, triggering electronics to indicate the presence of snow.

This wire-mesh screen device, though, suffers many drawbacks. Because the wire-mesh screen device is triggered by water, it unnecessarily enables snow melting equipment in response to the mere detection of rain. Additionally, the detection of precipitation by the wire-mesh screen device is very dependent on the trajectory of snow. In turbulent, multidirectional ground blizzards, for example, many snow flakes go undetected as they do not fall incident upon the screen. A heated wire-mesh screen can also evaporate precipitation as it is melting. With relatively light snow or precipitation, this evaporation prevents the detection of snow by the device.

Because of their limited detection area as determined by the size of the funnel system, wire-mesh screen devices must be placed very close to railroad tracks to ensure detection of ground blizzards. This requires the installation of electrical wiring near the track, making such wiring susceptible to being broken or damaged from maintenance trucks and crews.

Another precipitation detection device uses a pair of electrodes spaced apart by a known distance. Precipitation forms a conductive bridge between the electrodes, triggering an indicator that precipitation is present. These devices, however, unnecessarily enable snow melting equipment as mere rain will trigger the device. These devices also have a fixed and limited measuring volume as the electrodes must be relatively close to one another for precipitation to bridge the gap between the electrodes. Furthermore, precipitation which triggers the device may remain between the electrodes, preventing the device from appropriately disabling a heater when precipitation is no longer present. Debris built up between the electrodes may also prevent accurate triggering of the device depending on whether precipitation is present or not.

An electro-optical device serves as a rain gauge and uses a direct forward scatter technique. This electro-optical device emits a partially coherent light beam to a receiver less than a meter away. Another electro-optical device emits a laser beam to a receiver approximately fifty meters away. For both devices, rain or snow falling through the beam path scatters the light emitted by the devices' source. This scattered light is also referred to as "scintillation." Both devices calculate the amount of precipitation based on the detection of such scintillations over time.

These direct forward scatter devices, however, are subject to stability problems. The devices are susceptible to vibrations that can lead to pointing problems in aligning the light transmitter with the receiver. The devices are also cumbersome for setup and use, particularly where the transmitter and receiver are a good distance away from one another. Although a receiver may be placed less than a meter away from the source of a partially coherent light beam for one device, such a configuration suffers from having a fixed and limited measuring distance and volume for the detection of precipitation.

What is desired is a precipitation detection device that more accurately and reliably indicates the presence of precipitation. What is also desired is a precipitation detection device that can differentiate between types of precipitation, for example between rain and snow. What is further desired is a precipitation detection device that can detect precipitation over various sized measuring volumes. What is still further desired is a precipitation detection device that is relatively more stable and less cumbersome for setup and use.

BRIEF SUMMARY OF THE INVENTION

The present invention advantageously overcomes several drawbacks of prior precipitation detection devices described above.

A method for detecting precipitation in a volume is described. In the method, a source light is projected into the volume. Light from the volume, including any of the source light reflected from any precipitation within the volume is detected. A first signal corresponding to the detected light is generated. Whether precipitation is present in the volume is determined based on the first signal.

An apparatus for detecting precipitation in a volume is also described. The apparatus includes a light source for projecting a source light into the volume; a first detector for detecting light from the volume, including any of the source light reflected from any precipitation within the volume, and for generating a first signal corresponding to the detected light; and circuitry for determining whether precipitation is present in the volume based on the first signal generated by the first detector.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 1 illustrates a first exemplary embodiment for a precipitation detection apparatus in accordance with the present invention;

FIG. 2 illustrates in the form of a graph the intensity of a light beam as a function of radius in accordance with the present invention;

FIG. 3 illustrates in the form of a graph a Gaussian signal with a representative threshold and DC offset in accordance with the present invention;

FIG. 4 illustrates the reflection of light from a droplet of rain in accordance with the present invention;

FIG. 5 illustrates the reflection of light from a randomly shaped particle in accordance with the present invention;

FIG. 6 illustrates a polarizing beamsplitter in accordance with the present invention; and FIG. 7 illustrates a second exemplary embodiment for a precipitation detection apparatus in accordance with the present invention.

DETAILED DESCRIPTION

A detailed description for a method and apparatus for precipitation detection and differentiation in accordance with the present invention is set forth below. In the following description, numerous specific details are set forth such as specific devices, dimensions, configurations, etc., in order to provide a thorough understanding of the present invention. It will be evident, however, that the present invention may be practiced without these specific details. In other instances, well-known equipment, devices, circuits, etc., have not been described in particular detail so that the present invention is not unnecessarily obscured.

FIG. 1 illustrates one exemplary embodiment for a precipitation detection apparatus 10 in accordance with the present invention. Apparatus 10 is referred to as an electro-optical device. Apparatus 10 is also referred to as a combination, an assembly, and a system, for example. Apparatus 10 detects precipitation including rain or snow, for example. Apparatus 10 also differentiates between types of precipitation, for example between rain and snow.

Apparatus 10 is useful for a wide range of applications involving precipitation detection and/or differentiation. In railway systems, for example, apparatus 10 is particularly beneficial because constant monitoring of weather conditions near railway switching systems is crucial for efficient and safe railroad operations. Apparatus 10 may be configured with snow and ice melting equipment including a heater, for example, to enable such equipment to melt snow or ice built up around rail switches that can potentially obstruct proper rail switching.

Apparatus 10 can enable and disable such equipment depending on whether apparatus 10 detects the presence of precipitation. Apparatus 10 may also be configured to enable and disable such equipment depending on the type of detected precipitation. Although apparatus 10 may detect the presence of precipitation, it may enable snow and ice melting equipment only if the detected precipitation is snow, for example.

Apparatus 10 generates a beam of light and collects light scattered directly back from a particle passing through the beam of light to detect the presence of precipitation. This technique is referred to as a backscatter technique. Apparatus 10 may also use this scattered light to differentiate between types of precipitation.

As illustrated in FIG. 1, apparatus 10 includes a light source 12 and a lens 14. Light source 12 generates a light beam 13 and projects it through lens 14 and outward from apparatus 10. Light source 12 may emit light of a known wavelength and intensity.

Light source 12 may include a laser, such as a laser diode or helium neon laser for example, to generate a laser beam 13. Light beam 13 generated from light source 12 may be coherent. Light beam 13 generated from light source 12 may be linearly polarized. Light beam 13 may be horizontally polarized, for example. As discussed in greater detail below, the use of linearly polarized light allows apparatus 10 to differentiate between rain and snow particles.

Light source 12 projects light beam 13 through lens 14. Lens 14 may collimate light beam 13. Lens 14 may also be a cylindrical lens that spreads light beam 13 over a relatively wide measuring volume, improving the probability of precipitation falling through light beam 13. The term lens for lens 14 is not meant to be limited in meaning but rather includes, for example, any suitable system including a lens system for directing light beam 13 outward from apparatus 10.

The size of the measuring volume may depend on the type of light source 12. For one embodiment where light source 12 is a laser diode that has an elliptical output, a collimated light beam 13 approximately one (1) millimeter (mm) by 3 mm, for example, may be projected over a distance of 3 meters (m), for example. For another embodiment where light source 12 is a helium neon laser, a collimated light beam 13 approximately one (1) mm in diameter, for example, may be projected. For yet another embodiment where a white light source is used, a collimated light beam 13 approximately one (1) centimeter (cm) in diameter, for example, may be projected.

Precipitation falling through light beam 13 scatters light by reflection and refraction in all directions. A collection lens 16 collects a portion of this scattered light. Collection lens 16 also collects light from other sources. The term lens for collection lens 16 is not meant to be limited in meaning but rather includes, for example, any suitable system including a lens system for collecting light.

Collection lens 16 may be on-axis or off-axis relative to light source 12. With an on-axis collection lens, apparatus 10 may detect particles over a relatively large depth of focus and hence over a relatively larger measuring volume. An off-axis collection lens has a limited depth of focus, thus limiting the measuring volume. The angle of the off-axis collection lens determines the limits of the measuring volume. An off-axis collection lens, however, is beneficial for use in detecting and/or differentiating precipitation in confined areas as excess signal distortion is avoided.

Apparatus 10 may be configured to allow the angle of collection lens 16 with respect to light source 12 to be altered as desired. Apparatus 10, for example, may provide for the mechanical movement of light source 12 with respect to collection lens 16. Furthermore, collection lens 16 may be configured with a hole through which light beam 13 may pass from light source 12 and outward from apparatus 10.

Collection lens 16 directs the collected light to a beamsplitter 20. Beamsplitter 20 may separate the collected light into light 21 that has a horizontal or "P" polarization state and light 22 that has a vertical or "S" polarization state, for example. This is described in further detail below. Beamsplitter 20 directs collected light 21–22 to photosensitive detectors 41–42, respectively.

Photosensitive detectors 41–42 generate electrical signals 51 and 56, respectively, corresponding to light 21–22 received by photosensitive detectors 41–42, respectively. Photosensitive detectors 41–42 may include any suitable photosensitive device. Photosensitive detectors 41–42 may each include an avalanche photodiode, a PIN photodiode, or a photomultiplier tube, for example. Photosensitive detectors 41–42 generate electrical signals 51 and 56 based on, for example, the intensity of light 21–22 received by photosensitive detectors 41–42, respectively.

For one embodiment, beamsplitter 20 passes light 21–22 through narrow band pass line filters 31–32 prior to photosensitive detectors 41–42 to increase the signal-to-noise ratio (SNR) of the signal input into photosensitive detectors 41–42, respectively. Line filters 31–32 filter out any extraneous light from light 21–22, respectively, except that having a wavelength of light beam 13. Where light source 12 generates a laser beam 13, for example, line filters 31–32 have a peak efficiency throughput at the wavelength of the laser and a 10 nanometer pass band, for example. By allowing only laser wavelengths to pass through to photosensitive detectors 41–42, line filters 31–32 reduce any adverse effects of any excess or external light sources, such as sunlight, that can saturate any scattered light from precipitation and/or disrupt detectors 41–42 from detecting such light.

Photosensitive detectors 41–42 output signals 51 and 56 to a device 50. Device 50 is also referred to as a system, a combination, an apparatus, and circuitry for example. Device 50 determines whether any precipitation is present in the measuring volume based on signal 51 output from photosensitive detector 41.

For one embodiment where light source 12 generates a laser beam 13, the light scattered by precipitation and received by photosensitive detector 41 will have the same Gaussian distribution of light intensity as source laser beam 13. As illustrated in FIG. 2, the intensity of a laser along the Y-axis 81 as a function of radius along the X-axis 82 results in a Gaussian distribution curve 83. The laser has its highest intensity at a radius value of zero or location 84 along X-axis 82. This is also referred to as a Gaussian pedestal.

As illustrated in FIG. 3, the intensity of the collected light scattered by precipitation in the measuring volume also has a Gaussian distribution (curve 93) with respect to time (axis 91) as the particle passes through the volume. This effect is combined with the effects of the intensity of any light collected from ambient sources, such as the sun, resulting in a DC offset component 92. The Gaussian pedestal can be used as the source for precipitation detection in the measuring volume. That is, light collected by apparatus 10 that has a relatively high intensity, or one exceeding some predetermined threshold 94 as illustrated in FIG. 3, results from the collection of light scattered by precipitation in the measuring volume.

As illustrated in FIG. 1, device 50 comprises an AC couple device 52, a threshold device 54, and a signal processor 57 for one embodiment. Each of these devices 52, 54, and 57 may be referred to as a system, a combination, an apparatus, and circuitry for example.

AC couple device 52 receives signal 51 as an input from photosensitive detector 41 and adds an AC coupling component to that signal, generating and outputting signal 53. This AC coupling technique eliminates the effects of any light intensity fluctuations from ambient light sources falling onto photosensitive detector 41. Light intensity fluctuations can be a source of problems for any light sensitive equipment used in the outdoors, and may be caused by changes in the weather, by cloud cover, or by darkness, for example.

For another embodiment where light source 12 generates a laser beam 13, the effects of ambient light fluctuations may be eliminated by pulsing the laser at a known frequency greater than the rain frequency. Resultant signal 51, a relatively low frequency signal superimposed on a relatively high frequency signal, can then be processed and electronically filtered to remove the pulse frequency, thereby eliminating the effects of ambient light fluctuations. As one example where rain drops fall at a velocity of 5 meters per second (m/s) through a light beam 13 having a one (1) mm diameter, the maximum frequency of the resultant signal is 5 kilohertz (kHz), that is 5 m/s divided by one (1) mm. A relatively greater frequency, for example 1 megahertz (MHz), may be used to eliminate the effects of ambient light fluctuations.

Threshold device 54 determines whether precipitation is present in the measuring volume by determining whether the signal corresponding, for example, to the intensity of the collected light exceeds a predetermined threshold. If so, precipitation is determined to be present in the measuring volume as the intensity of the light collected by apparatus 10 resulted from the scattering of light beam 13 by precipitation in the measuring volume. Otherwise, apparatus 10 determines precipitation is not present in the measuring volume.

For one embodiment where AC couple device 52 is used, threshold device 54 receives signal 53 from AC couple device 52. Threshold device 54 may include any suitable thresholding device such as a Schmidt trigger, for example. Threshold device 54 generates and outputs a signal 55 indicating whether precipitation is determined to be present in the measuring volume.

As mentioned above, apparatus 10 may also differentiate between types of precipitation. Apparatus 10 can differentiate between rain and snow, for example.

As illustrated in FIG. 4, a spherical water or rain droplet 101 acts as a small mirror to directly reflect light while also maintaining the light's polarization state. For example, water droplet 101 directly reflects a linearly polarized light beam, represented as arrow 104, resulting in a scattered light beam, represented as arrow 105, that is also linearly polarized. For spherical particles, scattered light 105 emanates from only a small portion 102 of the entire droplet 101.

As illustrated in FIG. 5, a snow flake or particle 111 has a randomly shaped, crystalline form with a multitude of facets. These facets are all at different angles with respect to an incoming light beam, represented as arrow 104. Light that is directly reflected from snow flake 111 off a facet having a surface orthogonal to incoming light 104 maintains the light's polarization. Light that is reflected from snow flake 111 off a multitude of facets or generally off a facet having a non-orthogonal surface with respect to incoming light 104 has a polarization state different from that of incoming light 104.

As one example, light beam 104 is linearly polarized. Light scattered from a facet having a surface orthogonal to light beam 104 is then also linearly polarized. Light scattered from a multitude of facets or generally off a facet having a non-orthogonal surface with respect to incoming light 104 has a combination of linear and circular polarization states, also referred to as a randomly polarized state.

Using the above phenomena, apparatus 10 may differentiate between rain and snow. In doing so, apparatus 10 uses beamsplitter 20. For one embodiment that is illustrated in FIG. 6, beamsplitter 20 separates incoming light beam 120 having both horizontal or "P" and vertical or "S" polarization states into a light beam 121 having a horizontal or "P" polarization state and a light beam 122 having a vertical or "S" polarization state. Beamsplitter 20 passes light with a horizontal or "P" polarization state and reflects light with a vertical or "S" polarization state for this embodiment.

For one embodiment that is illustrated in FIG. 1, light source 12 generates a light beam 13 that is horizontally polarized. Apparatus 10 for this embodiment includes a beamsplitter 20 that separates the light collected by collection lens 16 into light 21 having a horizontal or "P" polarization state and light 22 having a vertical or "S" polarization state.

Where the precipitation detected is rain for this embodiment, all or substantially all of the collected light scattered from rain droplets passes through beamsplitter 20 to photosensitive detector 41, as such light is horizontally polarized. Where the precipitation detected is snow for this embodiment, the collected light having a horizontal polarization passes through beamsplitter 20 to photosensitive detector 41, and the collected light having a vertical polarization is reflected by beamsplitter 20 to photosensitive detector 42. As the light scattered from snow is randomly polarized, beamsplitter 20 splits such light approximately evenly.

Apparatus 10 may thus differentiate between rain and snow by comparing the relative intensity of the light received by photosensitive detectors 41–42. Because the relative intensity of light scattered from particles depends upon the diameter of the particle, the trajectory of the particle through light beam 13, and the distance of the particle from collection lens 16, for example, this technique is advantageous as the ratio of the relative intensity of light received by detectors 41–42 is independent of these factors.

Photosensitive detector 41 generates signal 51 corresponding, for example, to the intensity of collected light 21 that is horizontally polarized and outputs signal 51 to device 50. Photosensitive detector 42 generates signal 56 corresponding, for example, to the intensity of collected light 22 that is vertically polarized and outputs signal 56 to device 50.

For one embodiment, device 50 includes AC couple device 52 and threshold device 54 to determine whether precipitation is present in the measuring volume. Threshold 54 generates and outputs an electrical signal 55 to signal processor 57. Electrical signal 55 corresponds, for example, to the intensity of collected light 21 received by photosensitive detector 41. Signal processor 57 also receives signal 56 outputted from photosensitive detector 42.

Signal processor 57 may then compare the relative intensities of the horizontally polarized light 21 and the vertically polarized light 22 using signals 55–56 to determine whether the precipitation detected is rain or snow. For one embodiment, signal processor 57 may compute the ratio of the intensity of vertically polarized light to that of horizontally polarized light to determine whether rain or snow has been detected. If this ratio is zero or approximately zero, signal processor 57 determines that rain has been detected as the light scattered by rain has no or little vertically polarized light. If this ratio is one or approximately one, signal processor 57 determines that snow has been detected as the light scattered by snow has approximately the same amount of light horizontally polarized as is vertically polarized.

Signal processor 57 may then generate and output an electrical signal 58 indicating, for example, whether any precipitation has been detected in the measuring volume and/or whether any detected precipitation is snow or rain.

Device 50 may be comprised of any suitable circuitry, including software controlled devices for example, that can detect whether precipitation is present in the measuring volume based on signals 51 and/or 56. Device 50 may also be comprised of any suitable circuitry, including software controlled devices for example, that can differentiate between types of precipitation based on signals 51 and/or 56. For one embodiment, device 50 may convert signals 51 and/or 56 into suitable digital signals and based on those signals determine whether precipitation is present in the measuring volume and/or whether snow or rain is present in the measuring volume.

For another embodiment, device 50 may determine whether snow is present in the measuring volume based on signal 56. If apparatus 10 collects light when there is either rain or no precipitation in the measuring volume, no or little of the collected light will be vertically polarized. If apparatus 10 collects light when there is snow in the measuring volume, however, the collected light will have light that is vertically polarized. Device 50 may thus determine whether snow is present in the measuring volume based on whether signal 56 exceeds a predetermined threshold, for example. A threshold device, such as threshold device 54, may be used.

As described above, apparatus 10 may be configured with other apparatuses that are responsive to signal 58 outputted from device 50. For example, apparatus 10 may be configured with a heater and positioned near a railway switching system. Apparatus 10 may then enable the heater in order to melt snow built up at railway switches when apparatus 10 determines snow is in its measuring volume. Apparatus 10 may disable the heater when apparatus 10 does not detect any precipitation or when apparatus 10 determines that any detected precipitation is rain.

Other apparatuses may also be configured with apparatus 10 and may be responsive to or controlled by apparatus 10 depending on whether apparatus 10 detects the presence of precipitation in the measuring volume and/or depending on the type of any detected precipitation.

Apparatus 10 may be configured, for example, with a heater to melt snow or ice from bridges, parking lots, airport runways, sidewalks, highways, ramps, etc. Apparatus 10 may be configured with an alarm for audible indications or a display for visual indications, for example. As another example, apparatus 10 may be configured with a windshield wiper apparatus for a motor vehicle to enable and disable windshield wipers for any precipitation. As still another example, apparatus 10 may also be remotely configured with irrigation apparatuses or lawn sprinkling apparatuses to enable them when no precipitation is present and to disable them when precipitation is present. As still yet another example, apparatus 10 may be remotely configured with snow making equipment, for use by ski resorts for example, to disable such equipment when precipitation is present and to enable such equipment when no precipitation is present.

For apparatus 10, the light transmitter that includes light source 12 with lens 14 and the light receiver that includes collection lens 16, beamsplitter 20, line filters 31 and/or 32, and photosensitive detectors 41 and/or 42, are configured in one package. This configuration may be referred to as a transceiver. The light transmitter may be configured in a package separate from that of the light receiver. Apparatus 10 preferably has a transceiver configuration, however, as relatively strong amounts of vibrations will not significantly alter the light collection properties of apparatus 10.

As compared to forward scattering systems, apparatus 10 with its direct backscatter technique advantageously provides for less cumbersome setup and use and for a more reliable precipitation detection apparatus as apparatus 10 is relatively less susceptible to vibration and pointing instabilities with both the transmitter and receiver configured in the same package. Apparatus 10 may also be conveniently configured and operated in a protective housing, for example near a railway switching system, making apparatus 10 less susceptible to being damaged by severe weather, flying debris, and vandals, for example.

For other embodiments, apparatus 10 only detects precipitation. The detection of precipitation by apparatus 10 in conjunction with a temperature gauge may be used to differentiate between types of precipitation.

For these embodiments, beamsplitter 20, line filter 32, and photosensitive detector 42 are not used for the detection of precipitation by apparatus 10. Rather, collection lens 16 directs collected light to photosensitive detector 41. Device 50 may then be used to determine whether precipitation is present in the measuring volume based on signal 51 outputted from photosensitive detector 41, and to output a signal 58 indicating whether precipitation has been detected in the measuring volume. For one embodiment, device 50 includes AC couple device 52 and threshold device 54. Signal 55 outputted from threshold device 54 may be used as output signal 58 for this embodiment.

For another embodiment, once precipitation is detected in the measuring volume, a temperature gauge such as a thermometer may be used to establish whether it is rain or snow, for example. This temperature gauge may be coupled to device 50 such that device 50 may determine, based on the temperature in the volume as determined by the temperature gauge and based on signal 51, whether any detected precipitation in the measuring volume is rain or snow, for example.

Signal processor 57 may be used in this embodiment to receive a signal 55 from threshold device 54 indicating whether precipitation has been detected in the measuring volume. Signal processor 57 may also be configured to receive a signal from the temperature gauge indicating the temperature in the measuring volume. Signal processor 57 may then determine whether snow or freezing rain, for example, is present in the measuring volume and output a signal 58 indicating as such.

For these embodiments, light source 12 may generate any suitable form of light 13. That is, a linearly polarized light beam is not required as apparatus 10 for these embodiments does not differentiate between types of precipitation based on the scattered light. Any suitable source of monochromatic light may be used for light source 12.

FIG. 7 illustrates another exemplary embodiment for a precipitation detection apparatus 130 in accordance with the present invention. Apparatus 130 is referred to as an electro-optical device. Apparatus 130 is also referred to as a combination, an assembly, and a system, for example.

Apparatus 130 detects precipitation including rain or snow, for example. The above description for apparatus 10 applies to apparatus 130 to the extent the above description is not inconsistent with the following description for apparatus 130. Apparatus 130 likewise uses a direct backscatter technique.

Apparatus 130 uses a scanning mirror 137 coupled to and driven by a motor 138 to sweep a light beam 13 over a measuring volume. Scanning mirror 137 in conjunction with motor 138 are referred to as an assembly, a system, or a combination, for example. Scanning mirror 137 may be a polygonal spinning mirror having five (5) surfaces, for example. Apparatus 130 may advantageously sweep light beam 13 over a relatively larger measuring volume as compared to the measuring volume defined by a collimated light beam, for example.

Apparatus 130 includes a light source 12 that generates and projects a light beam 13 toward scanning mirror 137. Light beam 13 may be a coherent light beam. Scanning mirror 137 sweeps light beam 13 over the measuring volume. For example, a five-sided polygonal scanning mirror 137 sweeps light beam 13 for 72 degrees, that is 360 degrees divided by five (5) surfaces.

Precipitation falling through light beam 13 will scatter light by reflection and refraction in all directions. Scanning mirror 137 reflects a portion of this scattered light for collection into a collection lens 16. Collection lens 16 also collects light from other sources. Collection lens 16 may be on-axis or off-axis relative to light source 12. Collection lens 16 directs the collected light to a photosensitive detector 41.

Photosensitive detector 41 generates and outputs an electrical signal 51 corresponding to light 21 received by photosensitive detector 41. Photosensitive detector 41 may generate electrical signal 51 based on, for example, the intensity of light 21 received by photosensitive detector 41. For one embodiment, a line filter 31 filters out any extraneous light from light 21 except that having a wavelength of light beam 13 before light 21 is received by photosensitive detector 41.

Photosensitive detector 41 outputs signal 51 to device 50. Device 50 determines whether precipitation is present in the measuring volume based on signal 51.

Device 50 may include AC couple device 52 as described above to eliminate the environmental effects of ambient light fluctuations. For another embodiment where light source 12 generates a laser beam 13, laser beam 13 may be pulsed at a known high frequency. Resultant signal 51 may then be processed and electronically filtered to eliminate the effects of ambient light fluctuations.

To be effective in eliminating the effects of ambient light fluctuations, both of these techniques must account for the scanning rate of mirror 137. For one embodiment where motor 138 includes a common AC scanning motor running at 60 Hz and where mirror 137 includes a polygon mirror with five (5) surfaces, mirror 137 attains a scanning rate of 300 Hz. For the AC coupling technique to work effectively, AC couple device 52 must not filter out the 300 Hz obtained from scanning mirror 137. For the pulsed laser source technique, the pulse rate of laser beam 13 preferably has a greater frequency, for example one (1) MHz, relative to the mirror scan rate. Resultant signal 51, a low frequency signal superimposed on a high frequency signal, can then be processed and electronically filtered to remove the pulse frequency, eliminating the effects of ambient light fluctuations.

Threshold device 54 determines whether precipitation is present in the measuring volume by determining whether the signal corresponding, for example, to the intensity of the collected light exceeds a predetermined threshold. If so, precipitation is determined to be present in the measuring volume as the intensity of the light collected by apparatus 130 resulted from the scattering of beam 13 by precipitation in the measuring volume. Otherwise, apparatus 130 determines precipitation is not present in the measuring volume.

Apparatus 130 may also be configured for differentiating between types of precipitation. Apparatus 130 may be configured with a suitable beamsplitter and another photosensitive detector, as described above for apparatus 10, to differentiate between rain and snow based on the scattered light, for example. Apparatus 130 may also be configured with a temperature gauge as described above for apparatus 10 to differentiate between types of precipitation.

The scan rate of mirror 137 is important for increased particle detection as compared to that obtained using a single collimated, non-sweeping light beam. Assuming random events of precipitation, the sweeping of light beam 13 serves no significant advantage if the scan rate of mirror 137 is too low. Apparatus 130 may sweep light beam 13 at such a rate where, based on the size and velocity of the precipitation, apparatus 130 can sense a particle on both ends of the sweeping arc. If apparatus 130 sweeps light beam 13 at too high of a rate, however, the same particle may be detected twice, skewing the results. In situations where apparatus 130 is used to control another apparatus, such as a heater, apparatus 130 may enable the heater extraneously, causing a waste in power.

For one embodiment where light source 12 of apparatus 130 generates a laser beam 13, apparatus 130 is relatively laser safe as apparatus 130 reduces the potential number of eye damage incidents due to laser exposure. The Center for Devices and Radiological Health's (CDRH) criteria for classification of a laser product is based upon laser exposure to a stationary detector, roughly the size of a fully dilated human pupil. Because apparatus 130 sweeps laser beam 13 over a distance, the exposure time of a continuous wave (CW) laser is drastically reduced. Apparatus 130 may thus use relatively high power lasers for greater sensitivity to precipitation detection.

The present invention thus advantageously provides for a relatively more accurate and reliable indication as to whether precipitation is present. The present invention overcomes the drawbacks of devices that use electrode pairs where debris or prior precipitation may remain between the electrodes and prevent the device from accurately detecting current precipitation. The present invention also overcomes the drawbacks of wire-mesh screen devices where evaporation of precipitation and snow trajectory prevent proper detection of precipitation.

The present invention may also advantageously provide for the differentiation between types of precipitation. The present invention may thus, for example, provide for the enablement of a railway switch heater only when snow is detected, overcoming the drawbacks of devices that enable heaters upon the presence of any precipitation including mere rain.

The present invention may further advantageously provide for various sized measuring volumes, overcoming the drawbacks of devices that have fixed and limited measuring volumes, such as forward scatter devices or those that use electrode pairs. The present invention may also advantageously provide for the detection of ground blizzards without being susceptible to damage from being too close to the tracks, overcoming another drawback of wire-mesh screen devices.

The present invention may still further advantageously provide for less cumbersome setup and use as compared to forward scattering systems for precipitation detection. The present invention may also advantageously provide for more reliability and stability as compared to forward scattering systems for precipitation detection.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for detecting precipitation in a volume, comprising the steps of:
    (a) projecting a source light having a linear polarization into the volume;
    (b) detecting light from the volume, including any of the source light reflected from any precipitation within the volume;
    (c) separating the detected light into a first light beam having a horizontal polarization state and a second light beam having a vertical polarization state;
    (d) generating a first signal corresponding to an intensity of the first light beam and a second signal corresponding to an intensity of the second light beam;
    (e) determining whether precipitation is present in the volume from at least one of the first and second signals; and
    (f) determining a type of precipitation in the volume based on at least one of the first and second signals.

2. The method of claim 1, wherein the source light includes a laser beam.

3. The method of claim 1, wherein the determining step (d) includes the step of determining precipitation is present in the volume if at least one of the first and second signals exceeds a predetermined threshold.

4. The method of claim 1, wherein the projecting step (a) includes the step of reflecting the source light from a scanning mirror into the volume and wherein the detecting step (b) includes the step of reflecting the light from the volume off the scanning mirror toward a collection lens.

5. The method of claim 1, wherein the precipitation type determining step includes the step of differentiating between rain and snow based on the first and second signals.

6. A method for detecting precipitation in a volume, comprising the steps of:
    (a) projecting a source light having a linear polarization into the volume;
    (b) detecting light from the volume, including any of the source light reflected from any precipitation within the volume;
    (c) separating the detected light into a first light beam having a horizontal polarization state and a second light beam having a vertical polarization state;
    (d) generating a first signal corresponding to an intensity of the first light beam and a second signal corresponding to an intensity of the second light beam;
    (e) determining whether precipitation is present in the volume based on at least one of the first signal and second signals;
    (f) determining a temperature in the volume; and
    (g) providing a control signal based on the temperature.

7. An apparatus for detecting precipitation in a volume, comprising:
 (a) a light source for projecting a source light, including linearly polarized light, into the volume;
 (b) a beamsplitter for separating the light from the volume, including any of the source light reflected from any precipitation within the volume, into a first light beam having a horizontal polarization state and a second light beam having a vertical polarization state;
 (c) a first detector for generating a first signal corresponding to an intensity of the first light beam;
 (d) a second detector for generating a second signal corresponding to an intensity of the second light beam;
 (e) circuitry for determining whether precipitation is present in the volume based on at least one of the first and second signals; and
 (f) circuitry for determining a type of precipitation in the volume based on at least one of the first and second signals.

8. The apparatus of claim 7, wherein the source light includes a laser beam.

9. The apparatus of claim 7, wherein the circuitry for determining whether precipitation is present determines that precipitation is present if at least one of the first and second signals exceeds a predetermined threshold.

10. The apparatus of claim 7, further comprising a scanning mirror assembly for reflecting the source light into the volume and for reflecting the light from the volume toward a collection lens.

11. The apparatus of claim 7, wherein the circuitry for determining the type of precipitation present in the volume differentiates between rain and snow based on the first and second signals.

12. An apparatus for detecting precipitation in a volume, comprising:
 (a) a light source for projecting a source light including linearly polarized light into the volume;
 (b) a beamsplitter for separating the light from the volume, including any of the source light reflected from any precipitation within the volume, into a first light beam having a horizontal polarization state and a second light beam having a vertical state;
 (c) a first detector for generating a first signal corresponding to an intensity of the first light beam; and
 (d) a second detector for generating a second signal corresponding to an intensity of the second light beam;
 (e) circuitry for determining whether precipitation is present in the volume based on one of the first and second signals; and
 (f) circuitry for providing a control signal based on a temperature of the volume.

13. The method of claim 5 wherein a ratio of the first and second signals is used to determine the type of precipitation.

14. The method of claim 1, wherein the precipitation type determining step (f) includes the step of determining the type of precipitation based on whether at least one of the first and second signals exceeds a predetermined threshold.

15. The apparatus of claim 11 wherein the circuitry for determining the type of precipitation determines the type of precipitation from a ratio of the first and second signals.

16. The apparatus of claim 7 wherein the circuitry for determining the type of precipitation determines the type of precipitation from whether at least one of the first and second signals exceeds a predetermined threshold.

* * * * *